United States Patent
Bouchet

(10) Patent No.: US 8,103,591 B2
(45) Date of Patent: Jan. 24, 2012

(54) FLEXIBLE MANAGEMENT PROCESS FOR MULTIPLE ACTIVITIES EXECUTED ON PARTITIONABLE PLATFORMS OF A MULTIPLE PROCESSOR SYSTEM

(75) Inventor: Alain Bouchet, Villiers-Adam (FR)

(73) Assignee: Bull S.A.S., Les Clayes Sous Bois (FR)

( * ) Notice: Subject to any disclaimer, the term of this patent is extended or adjusted under 35 U.S.C. 154(b) by 1581 days.

(21) Appl. No.: 11/239,659

(22) Filed: Sep. 30, 2005

(65) Prior Publication Data

US 2006/0074850 A1 Apr. 6, 2006

(30) Foreign Application Priority Data

Oct. 1, 2004 (FR) ...................................... 04 10377

(51) Int. Cl.
*G06F 21/00* (2006.01)
(52) U.S. Cl. .................. 705/59; 702/187; 726/2; 726/3; 726/34; 719/318
(58) Field of Classification Search ...................... 705/59
See application file for complete search history.

(56) References Cited

U.S. PATENT DOCUMENTS

| 6,453,344 | B1 * | 9/2002 | Ellsworth et al. | ............. 709/220 |
| 6,820,040 | B2 * | 11/2004 | Bouchet | ........................ 702/187 |
| 7,200,701 | B2 * | 4/2007 | Stultz | ............................. 710/267 |
| 2002/0194392 | A1 * | 12/2002 | Cheng et al. | .................. 709/318 |
| 2003/0163509 | A1 * | 8/2003 | McKean et al. | ............... 709/100 |

FOREIGN PATENT DOCUMENTS

| EP | 1 324 176 A1 | 7/2003 |
| EP | 1 335 287 A1 | 8/2003 |
| EP | 1 341 087 A1 | 9/2003 |

OTHER PUBLICATIONS

Kevin Krewell, Multicore showdown: multicore moving from embedded to servers to clients, May 31, 2005, Microprocessor Report (Online), p. S1(5).*

* cited by examiner

*Primary Examiner* — Evens J Augustin
*Assistant Examiner* — Alexis Casey
(74) *Attorney, Agent, or Firm* — Miles & Stockbridge P.C.

(57) ABSTRACT

A method and system for flexible management of a plurality of activities executed within at least one computer hardware resource perimeter configured at least one multicellular computer platform. The activities are executed by identifying an activity using extended serial numbers attributed to the activity, authenticating the serial number of a subsystem on which execution of the activity is authorized, verifying the extended serial numbers, and recording the extended serial numbers as activity licenses.

18 Claims, 5 Drawing Sheets

FLEXIBLE MANAGEMENT PROCESS FOR MULTIPLE ACTIVITIES EXECUTED ON PARTITIONABLE PLATFORMS OF A MULTIPLE PROCESSOR SYSTEM

BACKGROUND OF THE INVENTION

1. Field of the Invention

This present invention concerns the area of computing and in particular of multiple processor systems. For example, the manufacturers of computer equipment are currently developing server centres composed of several interconnected servers, consisting of multicellular platforms, with multiple processors, sharing between them the tasks to be performed within the system that they constitute.

2. Description of Related Art

Certain known multiple processor systems of earlier design are static and not partitionable, meaning that, from the software viewpoint, they have an immutable structure which depends on the physical elements of the hardware platform. In these static systems, certain operating systems or certain applications use the serial number of the system on which they are executed as input data into their licence management mechanisms. This serial number is used, firstly, to guarantee that the operating system or the application are executed on a legal system (for which the licence has been sold) and, secondly, to guarantee the uniqueness of the identification and therefore of the use of the licence sold.

At the present time, one of the directions of development of the computer equipment and/or systems concerns the creation of maximum flexibility in configurable computer resources, to the benefit of a user disposing locally of considerably reduced computer resources.

Earlier designs of the prior art, in particular European patent applications EP 1324176, EP 1335287 and EP 1341087, disclose computer systems with multiple processors which are configurable and reconfigurable by the simple command of an operator, by means of a management tool (MT) of the system. These systems, of the type represented in FIG. 5, are composed of subsystems (4A, 4B) each consisting of a multicellular platform of computer resources. These multicellular platforms are composed of data processing cells (or computing cells, $C_{kj}$), which are connected together, each having at least one central processing unit (with several processors) and local working memories, of which at least one memory is non-volatile and called NVRAM (Non-Volatile Random Access Memory). In particular, the working memories of the cells include a start-up program or BIOS (Basic Input/Output System) and an access path to a system disk, located among the common resources of the system. At the start-up of a cell or of a group of cells, the access path is used by the BIOS program to ascertain the location of the system disk containing an operating system to be loaded and run, in order to manage the hardware resources of the computing cell or group of cells. The common resources of the system consist of the peripheral elements, such as mass memory for example, including in particular the system hard disks and data disks. The data disks include application software or applications composed of computer programs to be executed and/or data to be processed. In order to provide maximum flexibility of these systems, the common resources are connected to each multicellular platform (4A, 4B) via addressable interconnection resources (6), in accordance with a SAN architecture (Storage Area Network) for example. These interconnection resources (6) are intended to allow access to the common resources from any cell or group of cells. Thus, a data disk can be accessed from a cell ($C_{kj}$) in a given configuration of the platforms (4A, 4B), and then later by a cell ($C_{kj+1}$) in the context of a different configuration. Such interconnection resources (6) are therefore able to allow all of the cells of the platform to access the common resources with no necessity to perform any rewiring operation. The multicellular platforms (or subsystems) are said to be partitionable since they can be divided into partitions, which consist of one or more computing cells with multiple processors. The configurable or reconfigurable computer systems also include a management tool (MT) that allows a user to group the computer hardware resources into computer resource perimeters (P1, P2, ... Pi) intended to execute operational activities (A1, A2, ... Ai). Each perimeter (Pi) is formed by a partition (a group of computing cells) and a part of the common resources, such as at least one system disk and possibly a data disk. Each perimeter computer is thus managed by a specific multiprocessor operating system installed on a system disk of the common resources of the system. In general, an operational activity is an application that requires specific computing power, according to the type and the volume of data processed by this application. This power determines the configuration of a computer perimeter (Pi), configured by a user from an administration tool (9), with a view to executing the operational activity. The term "operational activity" refers to all of the software resources necessary to implement a function that a user of the system wants to create. Such functions include the preparation of pay records or the generation of lists of customers to be contacted for example. An activity therefore has at least one operating system capable of managing the computer hardware resources of a subsystem. Since the function desired by the user is generally not effected by the operating system on its own, an operational activity also commonly has one or more application programs intended to be executed on the operating system in order to create the function or functions desired by the user. Since the administration tool (9) controls the powering up of the different elements of the system and generally does not require as many computer resources as the operational activities executed on such systems, it can advantageously be composed, for example, of a computer connected in a local network to the subsystems making up the multicellular platform system. When two perimeters share the same common hardware resources, such as a given system disk or a given cell of a platform, they must be configured to be used successively in the system. Otherwise, they can be used simultaneously in the system.

In FIG. 5, for example, three perimeters (P1, P2 and P3) intended to execute an activity (A1) have been configured into a system that has two multicellular platform subsystems (4A and 4B), by means of a PAM administration program (Platform Administration and Maintainability program) executed on an Administration MT (Management Tool) (9). Perimeter P1, outlined by a line of short dashes, includes a first group of fourteen cells of a first multicellular platform (4A), a data disk (10), and a system disk (14). Perimeter P2, outlined by a line of long dashes includes a second group of six cells of the first multicellular platform (4A), distinct from the first group of cells, a data disk (12), and a system disk (16). Perimeter P3, outlined by a line of mixed dashes, includes a group of four cells of the second multicellular platform (4B) and the same disks as those of the P1 perimeters (10 and 14). The common resources (8) include a data disk (10) containing an application program (20), a system disk (14) containing an operating system (24), a data disk (12) containing an application program (22), and a system disk (16) containing an operating system (26). An operational activity (A1) can be supported here, for example, by a combination of program 20 and operating system 24, and be executed successively on perimeters P1 and P3, or by a combination of program 22 and operating system 26, and be executed on perimeter P2.

Such systems correspond to systems or machines usually known as partition machines. They are normally used to install and execute different operational activities (Ai), simultaneously or successively, in different perimeters of the platform. However, these systems would not allow a user to re-start the same activity in a different perimeter from that in which it was executed initially, without reinstallation or physical manipulation, while still preserving the execution context of the operational activity. In fact, the execution context of the operational activity, containing for example the different environment variables necessary at the start-up or restart of the operational activity, is saved, at least in part, in the local working memories of the perimeter. The execution context of an operational activity concerns, for example, the local clock parameters of the perimeter on which the activity was executed initially, the access path to the system disk necessary to the execution of the activity, or a personal log of events in which events that have occurred during the operation of the cell or of a group of cells are recorded. These events can, for example, be hardware incidents or alarms that have occurred during the operation of the cell or indeed events recorded by an operating system during its execution on this cell. This event log is also known by the acronym SEL (System Event Log). Thus, for example, if the user wishes to restart activity A2, not in perimeter P1 but in perimeter P2, the information recorded in the event log by activity A2, during its execution on perimeter P1, is lost. In fact, the event log of perimeter P1 is recorded in the local working memories of this perimeter P1, and is not accessible from perimeter P2. This loss of information, during the transfer of an activity from an originating perimeter to a destination perimeter, can lead to a malfunction of this activity when it is executed in its new perimeter.

European patent application EP 1324176 concerns a process and a system for backing up the local clock of a computer perimeter, configured on a multicellular platform of computer resources. This patent application deals with transferring the clock parameters from a perimeter on which an activity is executed to a perimeter on which this activity will be restarted in order to allow this activity to continue with no loss of information due to a failure to recognise the execution context. Each of the cells ($C_{kj}$) of the multicellular platforms includes a local equipment component capable of delivering a local clock signal. The invention consists of calculating and storing, for each activity executed on the different perimeters of the system, parameters relating to the offsets of the clocks of the different perimeters in relation to an absolute reference clock. During reloading of the operational activity for continued execution on a next computer perimeter, distinct from the current computer perimeter and with which is associated a next local clock that is distinct from the current local clock associated with the current computer perimeter, it consists of recalculating the time management parameters of the operational activity from the temporal offset parameter of the time management parameters in relation to the absolute reference clock, and of updating the next distinct local clock associated with this next distinct computer perimeter, prior to the launch of the said operational activity for continued execution.

European patent application EP1335287 concerns a process and a system for the automatic updating of an access path to the system disk of a computer resource hardware perimeter during the launch of an operational activity on this perimeter. The invention consists of saving to a memory, during the installation of a new system disk, a bottom part of the access path to the new system disk in a list of access paths, and then, at the time of specifying the operational activity, of associating with this activity the bottom part recorded in the list of access paths and, at the time of launching the activity on a perimeter, of automatically updating the access path contained in the working memory of this perimeter, combining the top part of the access path of this perimeter with the bottom part of the access path associated with this activity during its specification.

European patent application EP1341087 concerns a process and a system for the management of a personal event log containing events recorded by an operational activity executed on a computer resource perimeter configured on a multicellular platform computer. The invention consists of recording, during the saving of an event by an activity in a common event log, the event associated with an identifier of the activity that saved the event, and then, before consultation by an activity of its personal event log, of reconstructing the personal event log from the common event log, by selecting, from the common event log, only the events associated with the identifier of this activity, in order to include them in the personal event log reconstructed for this activity.

The multiple processor systems described in these three patent applications are flexible and partitionable. These systems are divisible into hardware subsystems that are considered to be independent from the software viewpoint, but whose boundaries can evolve over time by simple operator command. They are also flexible, in the sense that an activity installed in one of the partitions of a subsystem must be capable, without physical intervention, of being restarted in another partition of the same subsystem or in a partition of another subsystem controlled by the same administration program. However, this transfer of activity creates a problem for management of the licences of the programs necessary for the execution of the activities on the different perimeters of the system. In these flexible and partitionable systems, each subsystem has a different serial number. The movement of an activity from a perimeter containing cells of one subsystem to another perimeter containing cells of another subsystem, will therefore block the mechanism for the management of the licences, which does not find the serial number used initially for calculation of the licences. Each partition of a given subsystem gets the same serial number from the subsystem. A perimeter of the system therefore inherits the serial number of the subsystem to which the cells of the perimeter belong. Since the number of partitions in a subsystem and the boundaries between these partitions are dynamically variable, it is not possible to attribute its own unique serial number to each partition. An activity whose licence was calculated from the serial number of a subsystem, to be executed in a perimeter, can therefore be activated with impunity in each of the perimeters whose cells correspond to partitions of this same subsystem, which violated the uniqueness guarantee.

SUMMARY OF THE INVENTION

In this context, it is therefore useful to propose a process for management of the activities executed on the perimeters configured in a multiple processor system, guaranteeing the legality of the subsystems making up the system and the uniqueness of use of the licences.

The objective of this present invention is to overcome certain drawbacks of the earlier designs by proposing a process that allows flexible management of the many activities on multicellular hardware platforms of a multiple processor system, partitionable into partitions in multicellular platform subsystems making up the system.

This objective is achieved by a flexible management method for a plurality activities executed on at least one computer hardware resource perimeter configured on at least one multicellular computer platform of a multiple processor system, where each operational activity contains at least one operating system capable of managing the computer resources of the perimeter on which it is intended to be executed, and where the multicellular computer platform has several distinct computer hardware resource perimeters that can be activated successively or simultaneously on the platform, characterised in that the method includes the following steps:

identification of an activity in the process of initialisation on a perimeter of the system, by a management tool of the system, by means of an extended serial number associated with the activity in storage resources of the management tool and containing a serial number of a subsystem on which the execution of the activity is authorised, authentication of the serial number of the subsystem on which the execution of the activity is authorised, verification of the extended serial numbers of the activities already in the process of execution on the different subsystems making up the system, recording of the extended serial number, as an activity licence, in working memories of the computer hardware resources of the subsystem in which the perimeter, on which the activity is in the process of initialisation, is configured.

According to another particular feature, following the implementation of the steps of the method, activities that require a licence management mechanism based on the serial number principle execute a step for verifying the authenticity of the activity licence, where this step consists of a comparison, by the computer hardware resources of the subsystem in which the perimeter, on which the activity is in the process of initialisation, is configured, of the extended serial number on the one hand, recorded as an activity licence in the working memories of the computer hardware resources of the subsystem in which the perimeter on which the activity is in the process of initialisation is configured, and, on the other hand, the internal licence number of the program, where this comparison allows either the execution of the activity when there is agreement between these two licences, or interruption of the initialisation of the activity where there is no agreement.

According to another particular feature, it includes a preliminary step for the attribution of an extended serial number to each of the activities intended to be executed on perimeters of the system, through the entry of commands, effected by an operator, on input resources and display resources of the administration tool of the system, where these commands implement the following steps:

copying of the serial number of each of the subsystems on which the activities are intended to be executed, selection of one of these serial numbers for each of the activities and attribution of an extension to each of the activities, addition of the extensions to the selected serial numbers so as to obtain the extended serial numbers attributed to each of the activities, recording of the extended serial numbers, attributed to each of the activities, in a configuration memory, held in the storage resources of the administration tool of the system, during the installation of the activity on the system.

According to another particular feature, it includes a preliminary step for the declaration, to the publishers of programs that require a licence management mechanism based on the serial number principle for the execution of activities in systems, of the extended serial numbers attributed to the activities intended to execute in perimeters of the system, where this declaration step allows the manufacturers to implement these declared numbers in the calculation of the internal licences of the programs, for the step for verifying the authenticity of the licences of the activities.

According to another particular feature, it includes a preliminary step for the configuration of the system, through the input resources and display resources of the administration tool of the system, through entry by an operator who specifies, by means of a configuration module of the administration tool of the system, the activities to be executed on the different perimeters of the system, to allow the initialisation of at least one activity on a perimeter, where this perimeter can include computer hardware resources belonging to a subsystem other than the subsystem corresponding to the extended serial number attributed to the activity.

According to another particular feature, the authentication step of the subsystem on which the execution of the activity is authorised consists of a comparison, by an authentication module present in the processing resources of the administration tool of the system, of the serial number of the subsystem identified by the extended serial number of the activity, with a list of serial numbers of the subsystems making up the system, where this list of serial numbers of the subsystems is held in storage resources of the administration tool of the system and by means of this comparison, allows either interruption of the initialisation of the activity, when the serial number of the subsystem on which this activity is authorised to execute is not present in this list, or otherwise, continued implementation of the method.

According to another particular feature, the step for verification of the extended serial numbers of the activities in the process of execution in the system consists of a comparison, by a module for verifying the current activities present in the processing resources of the administration tool of the system, of the extended serial number of the activity in the process of initialisation, with a variety of extended serial numbers of activities in the process of execution in the system, where this variety allows either interruption of the initialisation of the activity, by the processing resources of the administration tool of the system, when the extended serial number of the activity in the process of initialisation is already being used for the execution of an activity on one of the perimeters configured on the system, or otherwise continued implementation of the method.

According to another particular feature, the method is implemented by an administration program of the multiple processor system, executed on the processing resources of the administration tool of the system and managing the configuration hardware of the system, by establishing perimeters in subsystems making up the system, in accordance with the commands of an operator, entered through the input resources and display resources of the administration tool of the system, where this administration program is used to control the operation of the computer hardware resources of the subsystems making up the system and to control the initialisation of activities on the perimeters configured on the system, by means of the extended serial numbers of these activities, by means of interface cards.

According to another particular feature, the step for recording of the extended serial number as an activity licence, in the working memories of the computer hardware resources of the subsystem in which the perimeter on which the activity is in the process of initialisation is configured, consists of a preliminary step for verifying the need for an activity licence for the execution of this activity and, if required, of a step for determining the location at which the extended serial number must be recorded as an activity licence, and then of recording the extended serial number, by a recording module, in an interface table for access to the computer hardware resources of the subsystem, at the determined location, corresponding either to a specific field, when the activity allows the specification of an address for verification of the licence, or to a standard field, when the activity requires the replacement of the serial number of the subsystem in which the perimeter is configured, by the extended serial number of the activity, in this standard field of the interface table for access to the computer hardware resources of the subsystem.

According to another particular feature, the step for the attribution of extended serial numbers to the activities is associated with the creation of objects, known as "identity objects", by an identity creation module present in the processing resources of the administration tool of the system, where the variables of these identity objects correspond to information relating to the execution of the activity in the perimeters configured on the system, such as the name of the activity, the need for a licence management mechanism, and the extended serial number attributed to the activity, as well as the location at which this extended serial number must be recorded before the execution of the activity, where the step for configuration of the system, effected by means of the configuration module of the administration tool of the system, is associated with the creation of objets known as "domain objects" whose variables correspond to information relating to the specification of perimeters and to activities to be executed on each of the perimeters configured on the system, where these identity objects and these domain objects are recorded in the configuration memory held in the storage resources of the administration tool of the system.

According to another particular feature, the authentication step of the subsystem on which the execution of the activity is authorised, can also consist of a comparison, by the authentication module, of the serial number of the subsystem identified by the extended serial number of the activity, with only the serial number of the subsystem on which the activity is in the process of initialisation, so as to prevent the execution of the activity on a subsystem other than that initially authorised.

Another aim of the invention is to propose a system that has a partitionable hardware platform with multiple processors that allows management of the execution of multiple activities.

This aim is met by a system for flexible management of the execution of multiple activities, having at least one subsystem with multiple processors constituting a multicellular computer platform of hardware resources, where an administration tool of the system has a configuration module to specify perimeters of computer hardware resources and to simultaneously or successively activate these perimeters on the platform, where each perimeter has one or more computing cells, of the common resources comprising resources for storage of the activities, each activity containing at least one operating system capable of managing the computer resources of the perimeter on which it is intended to be executed, characterised in that it includes:

storage resources of the administration tool of the system storing, firstly, a list of serial numbers each corresponding to one of the subsystems making up the system and, secondly, a configuration memory containing a plurality of extended serial numbers, associated with activities authorised to be executed on subsystems, processing resources of the administration tool of the system having:

a subsystem authentication module, authenticating the subsystems on which activities are authorised to be executed, according to the list of the serial numbers of the subsystems making up the system, held in the storage resources of the administration tool, a module for verifying the extended serial numbers of the activities in the process of execution on the perimeters configured in the system, according to a variety of extended serial numbers of activities being used in the system, and a module for recording the extended serial numbers as activity licences, in working memories of the computer hardware resources of the subsystem in which the perimeter, on which the activity is in the process of initialisation, is configured.

According to another particular feature, it includes input resources and display resources to enable an operator to attribute an extended serial number to each of the activities intended to be executed on perimeters of the system, by copying the serial number of each of the subsystems on which the activities are intended to execute, and then by selecting one of these serial numbers for each of these activities and adding an extension to it to obtain an extended serial number, and by recording the extended serial numbers thus attributed to each of the activities in the configuration memory held in the storage resources of the administration tool of the system.

According to another particular feature, the administration tool of the system includes a configuration module having resources to specify the activities to be executed on the different perimeters of the system, by resources for the initialisation of at least one activity on a perimeter, where this perimeter can include computer hardware resources belonging to a subsystem other than the subsystem corresponding to the extended serial number attributed to the activity, by means of resources for the creation of objects known as "domain objects" in which the domain objects created have variables corresponding to information relating to the specification of perimeters and to activities to be executed on each of the perimeters configured on the system, where the configuration module also has resources for the creation of objects, known as "identity objects", by an identity creation module, where the variables of these identity objects correspond to information relating to the execution of the activity in the perimeters configured on the system, such as the name of the activity, the need for a licence management mechanism and the extended serial number attributed to the activity, as well as the location at which this extended serial number must be recorded before the execution of the activity, where these identity objects and these domain objects are recorded in the configuration memory held in the storage resources of the administration tool of the system.

According to another particular feature, the computer hardware resources of the subsystems, in which the perimeters on which the activities are in the process of initialisation are configured, comprise resources to access interface tables stored in the working memories of these computer hardware resources, where the extended serial numbers are recorded as activity licences, by the recording module, in these interface tables, resources for comparison of these activity licences with internal licence numbers of the programs responsible for these activities, and resources for authorisation of the execution of these activities in the event of agreement between these activity licences and these internal licence numbers or for interruption of the initialisation of the activity where there is no agreement.

According to another particular feature, the processing resources of the administration tool of the system execute an administration program of the system managing the configuration hardware of the system by establishing computer perimeters in the subsystems making up the system, in accordance with the commands of an operator, entered through the input resources and display resources of the system, where this administration program is used to control, by means of standard interface cards, access to the hardware resources of the system, and to control the initialisation of activities on the perimeters of the system, by controlling the interoperability of the different modules and resources of the system.

According to another particular feature, the processing resources of the administration tool of the system comprise resources for verifying the need for licence management mechanisms for each of the activities, and resources to determine the location at which the extended serial number must be recorded before the execution of the activity, where these resources allow the recording of the extended serial number as an activity licence, by the recording module, at the determined location, in the reference tables for access to the hardware resources, stored in the working memories of the subsystems, in which the perimeters on which the activities are in the process of initialisation are configured.

According to another particular feature, the authentication module of the subsystems on which the activities are authorised to be executed, according to the list of serial numbers of the subsystems making up the system, include resources to compare the serial number of the subsystem on which an activity is authorised to be executed, identified by the extended serial number of the activity, with only the serial number of the subsystem on which the activity is in the process of initialisation, so as to prevent the execution of the activity on a subsystem other than that initially authorised.

BRIEF DESCRIPTION OF THE DRAWINGS

Other particular features and advantages of this present invention will appear more clearly on reading the following description, which is provided with reference to the appended drawings, in which.

DESCRIPTION OF THE PREFERRED
EMBODIMENT(s)

Figure 5:
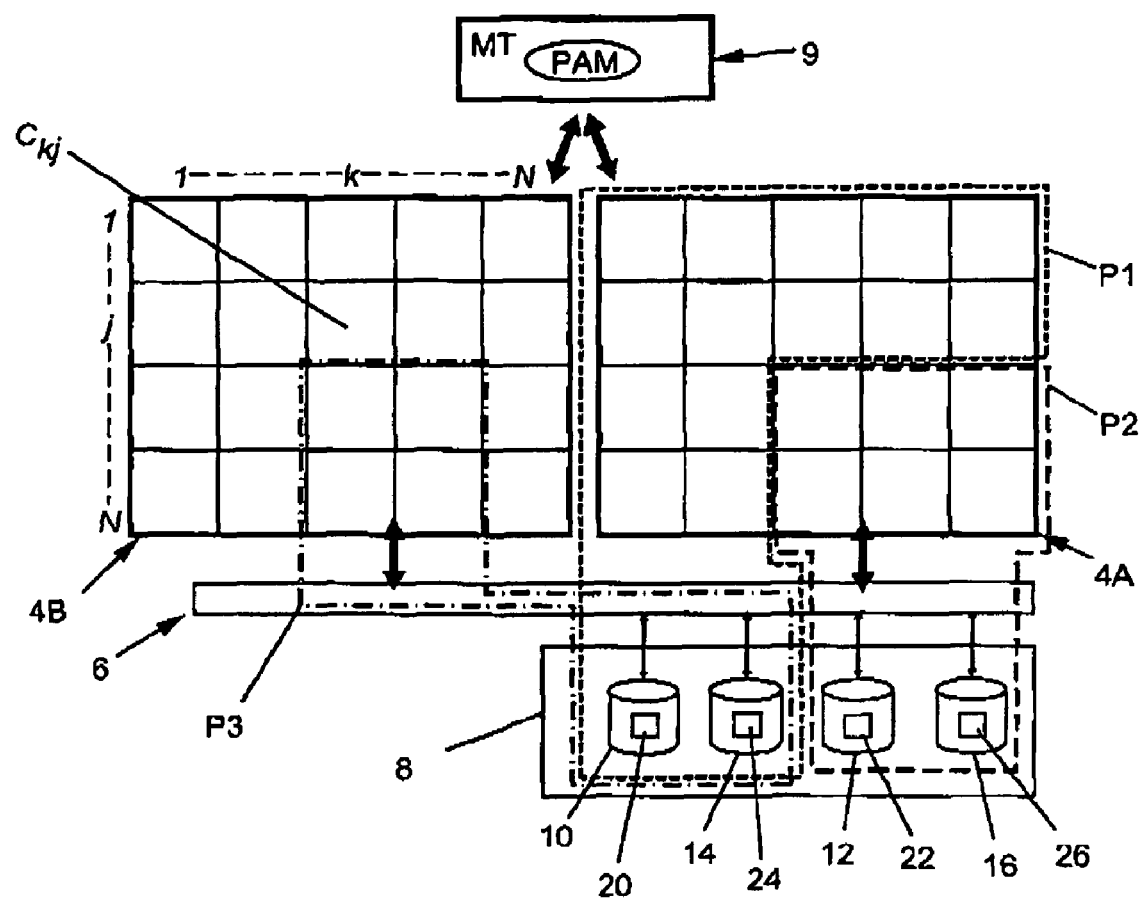
FIG. 5 represents a diagram of a multicellular platform system known from earlier designs.

FIG. 5 represents an example of a multiple processor system, having two multicellular platforms (4A and 4B) of computer hardware resources with 20 calculation cells ($C_{kj}$) each. These two platforms constitute subsystems (4A and 4B) of the system and are connected, via interconnection resources (6), to common resources (8) of the system having here, as an example, four mass memories (10, 12, 14 and 16). The operation of the common resources (8) by the computer hardware resources of the two subsystems (4A and 4B) of the system is controlled by an administration tool (9), for example, by means of an administration program (a PAM—Platform Administration and Maintainability program) executed on processing resources of this administration tool (9). Thus, three computer perimeters (P1, P2 and P3) have been represented by dashed lines in FIG. 5, to illustrate three examples of configurations of the system obtained by means of the administration tool (9), so as to allow the execution of a given activity with the aid of the information (22 and 26) necessary for this activity, stored in the mass memory (12 and 16, respectively) of the common resources (8) and processed by the calculation cells (Ckj) of these different computer perimeters (P1, P2 and P3).

Figure 1:
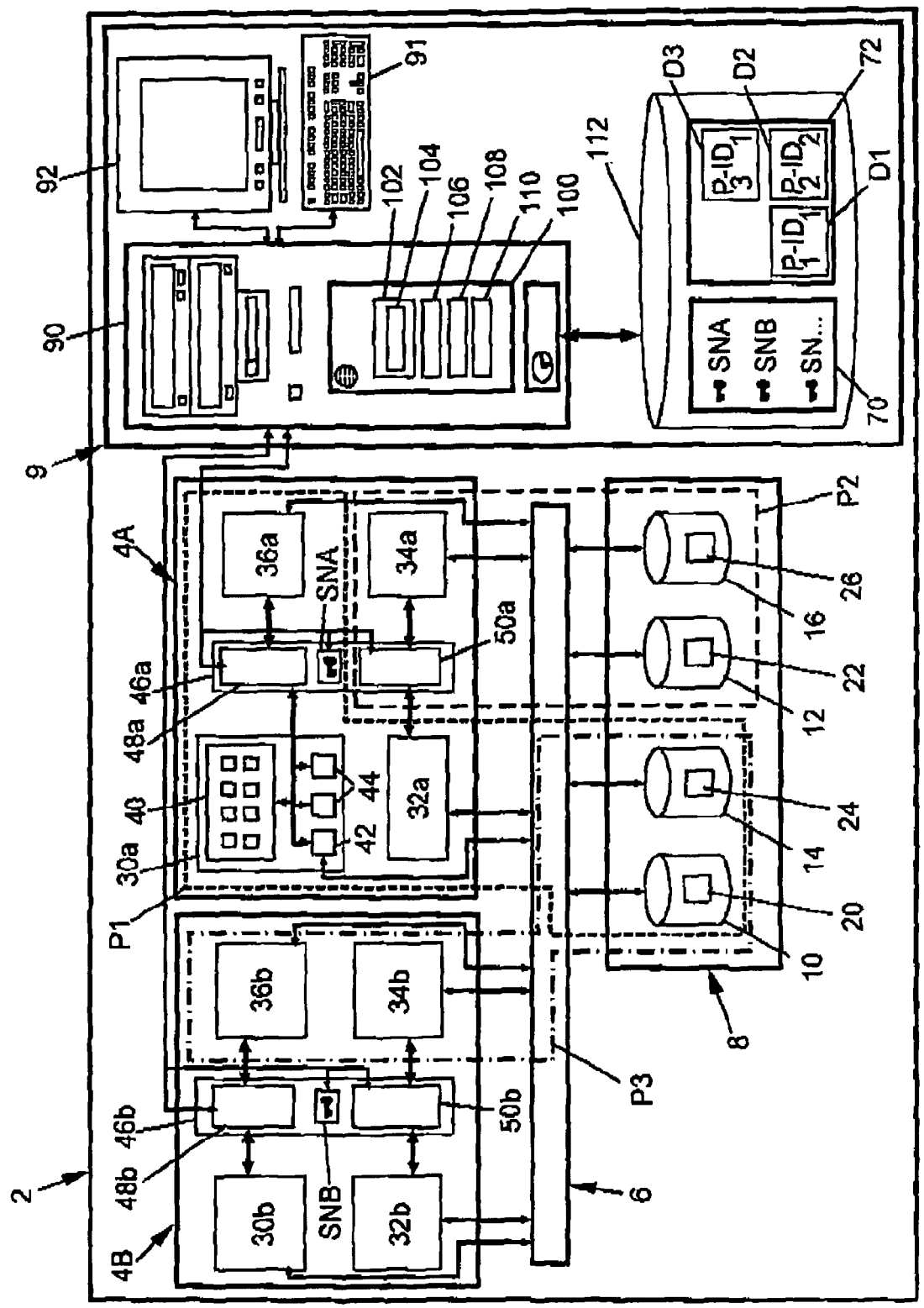
FIG. 1 is a schematic illustration of the hardware architecture of a system according to the invention.

FIG. 1 represents an example of the architecture of a multiple processor system (2) as shown in FIG. 5, but more detailed so that it better represents the invention. It shows two subsystems (4A and 4B), but here, these subsystems have only four computing cells each (30a, 32a, 34a, 36a and 30b, 32b, 34b, 36b, respectively). The equivalents of the computer perimeters (P1, P2 and P3) have been represented on this two-platform system (2) with four computing cells each. These computing cells of the two multicellular platforms (4A and 4B) of this configurable system (2) of computer resources are connected, firstly, to common resources (8), by means of interconnection resources (6), and, secondly, to an administration tool (9) of the system (2), via a set of interface cards (46a and 46b).

Here, as an example, the common computer resources (8) only have mass memories. These mass memories are here composed of two data disks (10 and 12) and two system hard disks (14 and 16). The data disks (10 and 12) are intended to contain application programs as well as the data to be processed. Here, data disk 10 contains application program 20 and data disk 12 contains application program 22. These data disks (10, 12) also hold the data to be processed. The programs (20, 22) are database management programs or hardware resource management programs for instance. In this example, the system hard disks (14 and 16) respectively include operating system 24 and operating system 26. These operating systems (24 and 26) are capable of managing the computer hardware resources of the two subsystems (4A and 4B). These operating systems are conventional operating systems such as LINUX®, UNIX® or Windows® for example, and offer functions for the installation of new activities on the platform. As an example, a first operational activity (A1) is implemented when program 20 is executed on these processors using operating system 24. This activity (A1) therefore has program 20 and operating system 24.

The interconnection resources (6) are able to connect any of the cells of the platforms (4A and 4B) to any of the disks (10, 12, 14 and 16). Thus, by means of the interconnection resources (6), no rewiring operation is necessary in order to connect any of the disks to any of the cells of the platforms (4A and 4B). These interconnection resources (6) are, for example, a network devoted to the storage of information according to the SAN architecture (Storage Area Network) and created from products known as "fibre channel switches".

Each of the two multicellular platform subsystems (4A and 4B) is divided into several computing cells. As an example, platform 4A includes four identical calculation cells (30a, 32a, 34a and 36a). Thus, only cell 30a will be described in detail. Each of the cells is able to execute the operational activities recorded in the common resources, either independently or in cooperation with other cells. In order to do so, this cell or this group of cells is managed by the operating system of the activity, recorded in the common resources.

Cell 30a also includes a central processing unit (40) connected by means of a data and address bus to an input/output card (42) and to local working memories (44). The data and address bus is also connected to a set of interface cards (46a) with the administration tool (9) of the system (2). The central processing unit (40) is intended to execute calculation operations. To this end, in the method of implementation described here, it includes eight 64-bit microprocessors capable of executing these calculation operations, in parallel and simultaneously. The input/output card (42) is intended to execute the exchanges of information between the common resources (8) and the cell (30a). To this end, it is connected to the interconnection resources (6) by an information-exchange link.

In particular, the local working memories (44) include a unique identifier for the cell. Here for example, this identifier is a serial number used to distinguish this cell (30a) from the other cells of the system (2). Two local working memories (44) are represented here. For example, these can be memories of the non-volatile type (NVRAM or "Non Volatile Random Access Memory"). This type of memory can be designed to contain the access path to the system disk which must be launched on the cell (30a). This access path therefore indicates which is the succession of equipment segments to be followed in order to reach the system disk. Such a memory (44) also includes the start-up program or BIOS program (Basic Input Output System). This BIOS program implements the elementary interface functions between the hardware resources of the cell (30a) and an operating system executed in this cell. This BIOS program is also able to launch the operating system corresponding to the access path recorded in the memory (44).

Here, the sets of interface cards (46a, 46b) of each of the subsystems (4A and 4B, respectively) each include two interface cards (48a, 50a and 48b, 50b, respectively) and a memory for storage of the serial numbers (SNA and SNB, respectively) of the multicellular platforms of these subsystems (4A and 4B). The administration tool (9) can thus gain access to the serial numbers (SNA and SNB) of all the subsystems (4A and 4B, respectively) that it has under its control. Cards 48a and 48b are connected to cells 30a, 36a and 30b, 36b, respectively, while cards 50a and 50b are connected to cells 32a, 34a and 32b, 34b, respectively. These cards (48a, 48b, 50a and 50b) are connected to the administration tool (9). They are identical and only card 48a will be described here. Card 48a is capable of managing the hardware resources of cells 30a and 36a. For example, this card (48a) is able to transmit, to the administration tool (9), information generated by the BIOS program of the local working memories (44) or, vice versa, to transmit by the administration tool (9) information to be recorded in standard interface tables, known as SMBIOS tables (System Management Basic Input Output System), stored in these local working memories (44). These SMBIOS tables act as standard interfaces to the operating systems, in order to communicate to them information associated with the configuration of the multicellular platform (4A). Likewise, these SMBIOS interface tables act as standard interfaces with the applications executed in the operating systems. For example, when an application requires a licence management mechanism, its initialisation in an operating system is accompanied by verification of a serial number stored in the SMBIOS tables. Such an application has a internal licence number, stored with the information allowing the configuration and/or the execution of the application on the operating system in which it is installed. When the application initialises itself in the system, it compares, for example, its internal licence number with the serial number recorded in the SMBIOS table. The invention therefore proposes the recording, by the administration tool (9), of serial numbers in these SMBIOS tables, as explained below and represented in FIG. 2. The SMBIOS tables, as well as most of the interface tables, have different fields used for recording diverse information specific to the hardware and software resources making up the interface. Among these fields of the SMBIOS tables, some are known as "standard", since they are used always (by default) by the operating systems and the applications, to record or read information relating to their execution on a system. Other fields of the interface tables are known as OEM (Original Equipment Manufacturer), and are fields inserted for the requirements of the publishers and left free so that the latter can use them as they require. These cards (48a, 50a) are also able to intercept the accesses by an operating system to the hardware resources of the cells. These accesses by the operating systems to the hardware resources of the cells are effected via the standard interfaces, either directly, or through the BIOS. For example, for each cell these cards (48a, 50a) can include a standard interface according to the specifications of the IPMI interface (Intelligent Platform Management Initiative), an EFI (Extended Firmware Interface), and an ACPI (Advanced Configuration and Power Interface). In the context of the invention, the interfaces of the multicellular platform to the operating systems do not require implementation of all of the specifications, but simply of an interface table such as the SMBIOS table for example. In the multicellular platforms according to the invention, the interface cards (48a, 50a) are able to retransmit any instruction intercepted by means of these interfaces immediately to the administration tool (9). These instructions are transmitted to the administration tool (9) together with a unique identifier used to identify the activity that transmitted this instruction. Thus, each operating system provides functions for management of the computer hardware resources of the multicellular platforms. These functions are either implemented at the initiative of a program executed on this operating system, or implemented at the initiative of the operating system itself. For example, the set of instructions used here is a standard instruction set according to the specifications of the standard IPMI interface drawn up by Intel. This specification describes the hardware interface that must be fitted to the platforms (4A and 4B), meaning, for example, the information storage registers, as well as the software interface, meaning, for example, the peripheral drivers that the operating system must have.

By means of these sets of interface cards (46a and 46b) allowing the transmission of information from these standard interfaces to the administration tool (9), the latter is capable of managing the configuration of the subsystems (4A and 4B, respectively). For example, the administration tool (9) is created from a computer (90), distinct from the subsystems (4A and 4B), equipped with input resources (91) such as a keyboard and display resources (92) such as a screen. This computer (90) naturally includes processing resources (100) and storage resources (112). These storage resources (112) contain, firstly, a list (70) of serial numbers (SNA, SNB) of the subsystems making up the system (2) according to the invention and, secondly, a configuration memory (72) for the storage of descriptions of computer files or logical objects, known as "domain" objects (D1, D2, D3), which are liable to be activated on the subsystems (4A and 4B).

The domain objects (D1, D2, D3) include variables corresponding to information relating to the specification of perimeters (P1, P2, P3) and to activities to be executed on each of the perimeters (P1, P2, P3) configured on the system (2). A domain object includes, firstly, a specification file for a computer resource hardware perimeter (P1, P2, P3) and, secondly, a logical object, called an "identity" objet (ID), describing an activity to be executed on a perimeter. The variables of an objet identity (ID) correspond to information relating to the execution of an activity in one of the perimeters (P1, P2, P3) configured on the system (2). These variables of the identity objects (ID) are intended to contain all of the configuration parameters necessary for the execution of the operating system of the activity in a manner such that this operating system can be executed on any perimeter using the same configuration parameters. The independence of the operating system in relation to the hardware resource perimeter on which it is or will be executed is thus achieved. An identity object also includes information to indicate which is the operating system to be activated and, possibly, the application program(s) to be executed in order to create the function desired by the user. Since the operating systems and the application programs frequently require a licence management mechanism based on the serial number principle, the invention also provides for the recording, among the variables of the identity objects (ID), of an extended serial number (SN/ext) attributed to an activity, and acting as an authorisation licence for the execution of this activity. The details concerning the attribution and the use of the extended serial numbers will be described later. The specification file of a perimeter (P1, P2, P3) contains a unique identifier for this perimeter (P1, P2, P3) and the specification of the computer hardware resources intended to execute the operational activity corresponding to the identity object (ID) recorded in the domain object (D1, D2, D3). To this end, the specification of a perimeter includes one or more cell identifiers of the subsystems (4A, 4B), at least one reference to the system disk containing the operating system to be executed and, here, one or more references to data disks containing the application program(s) to be executed and/or the data to be processed.

As an example, here the configuration memory (72) includes three domains, denoted D1, D2 and D3. Domain D1 includes the specification of a perimeter (P1) and of an activity (A1) identified by objet ID1. Perimeter P1 described in this example is represented schematically by a line of short dashes and includes three cells (30a, 32a and 36a) of the first subsystem (4A), as well as the data disk (10) and the system disk (14) of the common resources (8). Identity object ID1, for its part, includes an identifier for the activity (A1), identifiers for an application program (20) and an operating system (24), as well as an extended serial number (SN/ext) which acts as a licence number for activity A1 during its initialisation on the system (2). Domain D2 includes a specification file for a perimeter (P2) and for an activity (A2) identified by objet ID2. The perimeter (P2) described in this example is represented schematically by a line of long dashes, and includes a cell (34a) of the first subsystem (4A), the data disk (12), and the system disk (16). The identity object (ID2), for its part, contains an identifier for an activity (A2) and identifiers for an application program (22) and an operating system (26), as well as an extended serial number (SN/ext). Domain D3 includes a specification file for a perimeter (P3) and an identity object (ID1) identifying the activity (A1). Perimeter P3 is represented by lines of mixed dashes, and includes two cells (34b and 36b) of the second subsystem (4B), a data disk (10), and a system disk (14). In the case where a perimeter, such as perimeter P1, having several cells, is activated on a platform (4A), only one of the cells is a "master" cell, while the other cells of the same perimeter are slave cells. Thus, this set of cells behaves in reality as a single multiprocessor processing unit. For example, the "master" cell is automatically determined by choosing the cell with the lowest serial number in the perimeter. In such a situation, only the IPMI hardware interface associated with the "master" cell is used, to transmit to the administration tool (9) the information generated by the activity executed in this multicellular perimeter.

Domains D1, D2, and D3 are specified by an operator who, through the input resources (91) and the display resources (92) of the administration tool (9), effects the entries to configure the system (2). In particular, the processing resources (100) of the administration tool (9) include a configuration module (102) used to describe the activities to be executed on the different perimeters (P1, P2, P3) of the system (2). This configuration module (102) is used for creating the domain objects (D1, D2, D3) whose variables correspond to information relating to the specification of perimeters (P1, P2, P3) and to activities to be executed on each of the perimeters (P1, P2, P3) configured on the system (2). An identity creation module (104), also present in the processing resources (100) of the administration tool (9) of the system (2), is used for creation of the identity objects (ID) whose variables correspond to information relating to the execution of the activities in the perimeters (P1, P2, P3) configured on the system (2). This identity creation module (104) is thus used to install the activities on the various perimeters (P1, P2, P3) configured on the system and, during this installation, to attribute a name and an extended serial number (SN/ext) to each of the activities.

Figure 2:
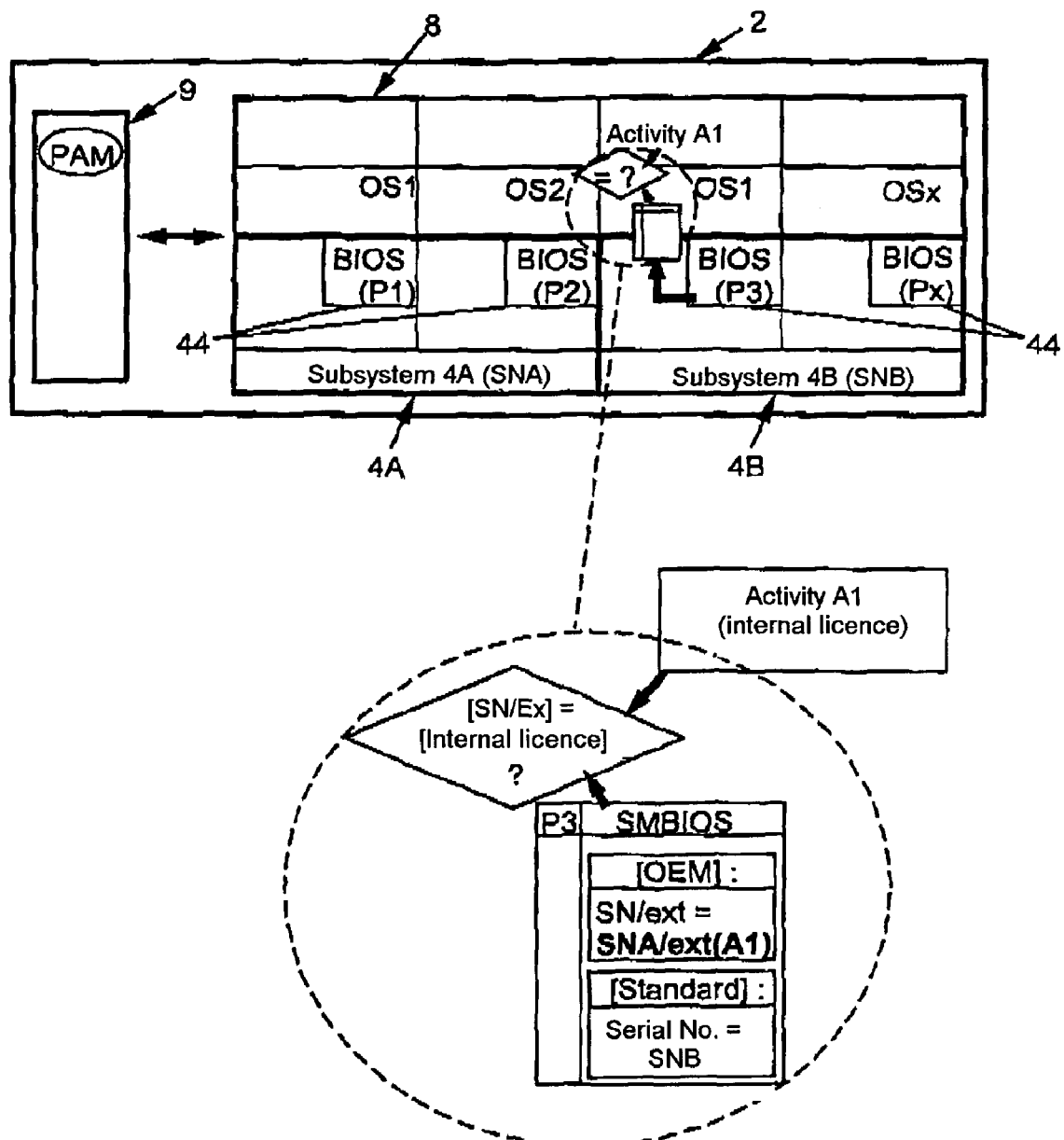
FIG. 2 represents the initialisation of an activity on a system according to the invention, and in particular comparison of the internal licence of this activity with the extended serial number recorded in the local working memories of the subsystems.
Figure 4:
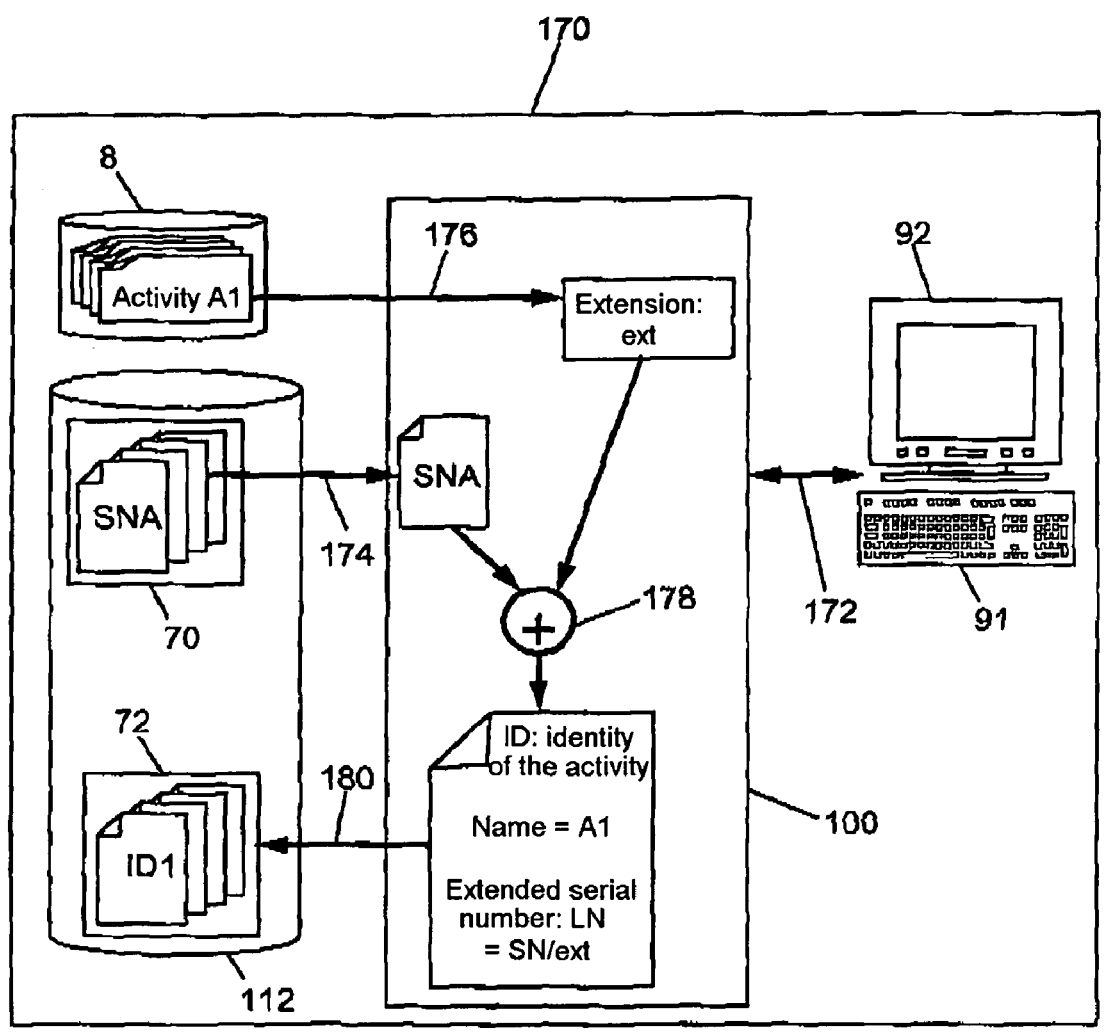
FIG. 4 represents a diagram of the configuration stages of the system of FIG. 1, prior to implementation of the process of FIG. 3.

As previously indicated, certain activities require application programs and operating systems whose execution is conditional on the validation of an operating licence number. During their initialisation on the system (2), these activities that require a licence management mechanism will compare their internal licence number with the extended serial numbers (SN/ext) according to the invention, attributed beforehand by means of a stage (170) for the attribution of an extended serial number (SN/ext) to each of the activities intended to be executed on the perimeters (P1, P2, P3) of the system (2). This extended serial number attribution stage (SN/ext) (170), represented schematically in FIG. 4, is created by means of the identity creation module (104) which requires the entry (172), by means of the display resources (92), of commands by an operator on the input resources (91) of the administration tool (9). For example, when an operator installs an activity (A1) on a perimeter (P1) of the system (2), the processing resources (100) of the administration tool (9) of the system (2) make a copy (174) of the serial numbers (SNA, SNB) of the subsystems (4A, 4B) making up the system (2), and the identity creation module (104) requires the selection, by the operator, of one of these serial numbers (SNA, SNB). This selected serial number can, for example, consist of the serial number (SNA) of the subsystem (4A) on which the perimeter (P1) is configured and on which the operator wishes to initially authorise the execution of the activity (A1), but can also consist of any of the serial numbers (SNA, SNB) of the subsystems (4A, 4B) controlled by the administration tool (9). Then the operator enters an extension, consisting of two numerical characters, for example, that he wishes to see attributed to an activity. Following this attribution (176) of the extension to the activity, the identity creation module (104) effects the addition (178) of the extension to the copied serial number (SNA), to obtain an extended serial number (SN/ext), recorded (180) in the configuration memory (72) held in the storage resources (112) of the administration tool (9) of the system (2). This extended serial number (SN/ext) of the identity object will serve as a licence number for the activity during its initialisation on a perimeter, if so required. In these identity objects (ID1, ID2, ID3), the operator will also be able to enter information relating to the need for the licence management mechanism for the execution of the activity on the platform. For example, if an activity does not need an activity licence for its execution, the identity object can, for example, contain no extended serial number, and the processing resources (100) of the administration tool (9), by accessing this identity object variable during the initialisation of the activity on the platform, can authorise its initialisation without prior recording of any extended serial number. In another example, the identity object can contain a variable specifically dedicated to this specification of a need for an extended serial number. If the activity requires an activity licence for its execution on the platform, the identity object will also contain a variable for use in describing the location at which the extended serial number is to be recorded (SN/ext), so that the activity can authenticate it as an activity licence, before being executed on one of the subsystems (4A, 4B) of the platform. The location and the variables used for its specification will be detailed later. Once these variable values have been attributed to an identity object in an activity, the operator can, for example, describe other perimeters (P3) on which he wishes to allow the execution of the activity by describing other domains (D3), using the configuration module (102). In the example of FIG. 1, domain D3 associates perimeter P3 with identity object ID1, identifying activity A1. The extended serial number (SN/ext) of activity A1) has inherited the serial number (SNA) from the subsystem (4A) on which its execution was initially authorised. This serial number (SNA), thus inherited, is different from the serial number (SNB) of the subsystem (4B) on which the perimeter is configured (P3), but, as explained in detail below, the implementation of the invention will allow the execution of activity A1 on perimeter P3, despite this lack of agreement between the serial numbers (SNA and SNB) of the subsystems. When a program requires a licence management mechanism based on the serial number principle, it includes an internal licence number, encrypted or not, which is always verified at the start-up of the corresponding activity on a system (2). The invention therefore proposes that when the operator has attributed an extended serial number to an activity, he declares, to the publishers of programs (20, 22, 24, 26) that require a licence management mechanism based on the serial number principle, the extended serial numbers (SN/ext) attributed to the activities intended to be executed in the perimeters (P1, P2, P3) of the system (2). This declaration stage then enables the manufacturers to implement these declared numbers (SN/ext) in the calculation of the internal licences of the programs (20, 22, 24, 26). Thus, the internal licences of these programs are calculated to accept the extended serial numbers (SN/ext) instead of the serial numbers (SNA, SNB) of the subsystems (4A, 4B) used conventionally. An activity thus declared to the program publisher will therefore have an internal licence number that corresponds to the serial number of a subsystem on which it is initially authorised, combined with an extension, left to the choice of the operator and specific to the activity. During its initialisation, the activity will execute a stage (140) for verifying the extended serial number (SN/ext) recorded, as an activity licence, in a working memory (44) of the subsystem in which it is in the process of initialisation (initializing), in order to compare this extended serial number (SN/ext) with its internal licence number. FIG. 2 schematically illustrates the particular example of the execution of the activity (A1) on perimeter P3 represented in FIG. 1. FIG. 2 shows the administration tool (9) which is used to manage the configuration of the system (2), and in particular of the two subsystems (4A and 4B) and of the common resources (8) containing the operating systems (OS1, OS2, OSx) and the programs necessary for the activities. As mentioned previously, the computing cells of the subsystems (4A and 4B) include local working memories (44) used to store the BIOS program and the SMBIOS interface tables. Each perimeter (P1, P2, P3) configured on the subsystems requires the interface supplied by the BIOS and the SMBIOS tables stored in these working memories (44). Activity A1 has an internal licence number created by the publisher of the program(s) responsible for this activity. During its initialisation on the system, the activity accesses the local working memories (44) to look up the SMBIOS table and to compare its internal licence number with the extended serial number (SN/ext) which was initially attributed to the activity (A1). The interface SMBIOS table is represented in FIG. 2, to illustrate an example of recording, by the administration tool (9), of the extended serial number (SN/ext) in an OEM field of the SMBIOS table. During the authorisation of its execution on the subsystem (4A), the activity (A1) inherited the serial number (SNA), and its extended serial number (SN/ext) can, for example, be expressed in the form SNA/ext(A1), where ext(A1) represents the extension attributed to the activity (A1) during its initial authorisation on the subsystem (4A) from which it inherited the serial number (SNA). And yet, it can be seen, for example, that in a standard field of the SMBIOS table, there appears the serial number (SNB) of the subsystem (4B) on which the perimeter (P3) in which the activity (A1) in the process of initialisation in FIG. 2 is configured. Activity A1 is therefore in the process of initialising in a subsystem (4B) which has a serial number (SNB) other than the one (SNA) on which it is authorised to be executed, but since the invention allows the activity (A1) to compare its internal licence number with the extended serial number (SN/ext) recorded by the administration tool (9) in the SMBIOS table of the subsystem (4B) on which it is in the process of initialising, then the activity will be able to execute without difficulty, as if it were on the subsystem (4A) initially authorised. It is obvious that the preliminary stage for the declaration of the extended serial numbers (SN/ext) to the program publishers depends on the algorithms used for the authentication of the operating licences and that the invention can include the encryption and/or decryption of the licences used. It is also obvious that for the programs that do not require any preliminary declaration to the manufacturer of the serial number of the system on which they must be installed, but that require the entry, during the installation of the program on the system (2), of a registration number left to the choice of the user, then the invention can, for example, include a stage for the entry of the extended serial number (SN/ext) during the installation of the program on the system (2). Likewise, it is obvious that for the programs that require no licence management mechanism, the invention allows the execution of the activity in any perimeter (P1, P2, P3) configured on the system (2).

Figure 3:
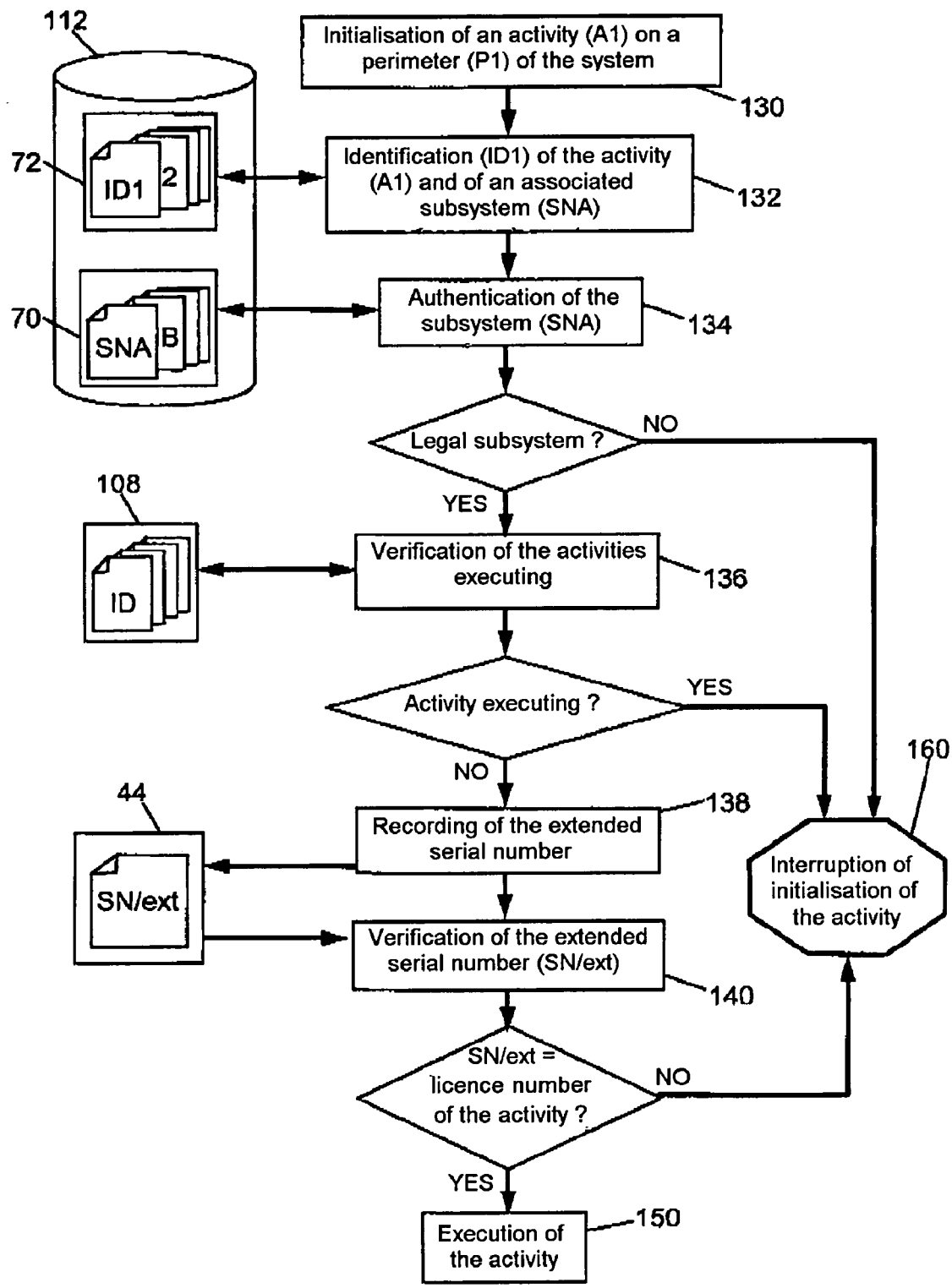
FIG. 3 represents a diagram of the process according to the invention, as it would be implemented in the system of FIG. 1.

The system (2) according to the invention, and in particular the administration tool (9), includes special resources, such as a subsystem authentication module (106), a module (108) for verifying the extended serial numbers of the current activities and a module (110) for recording the extended serial numbers (SN/ext), as activity licences, in working memories (44). These special resources of the invention are, for example, implemented in the processing resources (100) of the administration tool (9) and allow the use of extended serial numbers (SN/ext) as activity licences, to enable or disable the execution (150) of the activities on perimeters P1, P2, and P3. The description of the functions performed by these special resources will now be explained in relation to the implementation of the process according to the invention with reference to FIG. 3.

During the initialisation (130) of an activity (A1), on perimeter P1 of FIG. 1 for example, activated by means of domain object D1 configured using configuration module 102 of the system, the processing resources (100) of the administration tool (9) perform identification (132) of activity A1 by means of the extended serial number (SN/ext) associated, in the configuration memory (72), with activity A1 in object ID1 of the activated domain (D1). These processing resources (100) of the administration tool (9) extract from this extended serial number (SN/ext) the serial number (SNA) of the subsystem (4A) on which the execution of activity A1 according to domain object D1 is authorised. The subsystem authentication module (106) then performs an authentication (134) of the serial number (SNA) of the subsystem (4A) on which the execution (150) of the activity (A1) is authorised, by means of a comparison of the serial number (SNA) of the identified subsystem (4A) with a list (70) of the serial numbers (SNA, SNB) of the subsystems (4A, 4B) making up the system (2). This list (70) of serial numbers (SNA, SNB) of the subsystems is held in the storage resources (112) of the administration tool (9) of the system (2) and specifies the subsystem that the administration tool (9) has under its control. When the serial number (SNA) of the subsystem (4A), extracted from the extended serial number (SN/ext) and describing the subsystem (4A) on which this activity (A1) is authorised to be executed, is not present in this list (70), the subsystem authentication module (106) returns an error message interrupts (160) the initialisation of the activity. This stage is therefore used to ensure that an activity will not be executed on a subsystem that has not been authenticated.

If the extracted serial number (SNA) does exist in the list of the serial numbers that the administration tool (9) has under its control, then the process continues with stage (136) for verifying the extended serial numbers (SN/ext) of the activities in the process of execution (150) on the different subsystems (4A, 4B) making up the system (2). The module (108) for verifying the current activities makes a comparison of the extended serial number (SN/ext) of the activity (A1) in the process of initialisation (130) with a variety of extended serial numbers (SN/ext) of activities in the process of execution in the system (2). The processing resources (100) of the administration tool (9) monitors the execution (150) of the activities on the different subsystems (4A, 4B) making up the system (2) and is therefore able, at any time, to check the extended serial numbers (SN/ext) of the activities in the process of execution on the system (2). After reading and comparing all the extended serial numbers of the activities in the process of execution on the system (2), when the extended serial number (SN/ext) of the activity in the process of initialisation is already being used for the execution (150) of the activity (A1) on one of the perimeters (P1, P2, P3) configured on the system (2), then the initialisation of the activity is interrupted (160) by the processing resources (100) of the administration tool (9) of the system (2). This stage is therefore used to ensure that a given program licence is not used on several subsystems at the same time and therefore to guarantee the uniqueness of the use of the licence.

If the extended serial number (SN/ext) is not already being used by an activity in the process of execution on the system, then the process continues with a stage for recording (138) of the extended serial number (SN/ext), as an activity licence, in one of the working memories (44) of the computer hardware resources of the subsystem (4A) in which the perimeter (P1 on which the activity (A1) is in the process of initialisation) is configured. This stage (138) is used to place the extended serial number (SN/ext) of the activity (A1) at the disposal of the computing cells (30a, 32a, 36a) for the latter to effect a comparison of this extended serial number (SN/ext) with the internal licence number of the program. Following this stage (138) for recording of the extended serial number (SN/ext) in a field of the interface tables stored in the working memories (44) of the subsystem, the activities that require a licence management mechanism based on the serial number principle execute a stage (140) for verifying the authenticity of the activity licence. As mentioned previously, this stage (140) consists of a comparison, by the computer hardware resources of the subsystem (4A) in which the perimeter (P1) on which the activity (A1) is in the process of initialisation is configured, of the extended serial number (SN/ext) with the internal licence number of the program. This comparison then allows either the execution (150) of the activity (A1) in the event of agreement between the extended serial number (SN/ext) and the internal licence number of the program, or interruption (160) of the initialisation of the activity (A1) where there is no agreement. In the example represented in FIG. 2, where the activity is in the process of initialisation on a perimeter (P3) other than that (P1) initially authorised, the stage (138) for recording, by the administration tool (9), of the extended serial number (SN/ext) in a local working memory (44), for example in the SMBIOS table, allows the activity to be executed on a subsystem (4B) other than that (4A) initially authorised, as it actually initialises on the authorised subsystem (4A). For example, the activity (A1), initially authorised to be executed on a perimeter (P1) of a first subsystem (4A) is in the process of initialisation on another perimeter (P3) configured on another subsystem (4B), and the invention allows the activity to be executed on this other perimeter (P3) to the extent that it is not already executed on the subsystem (SNA) on which it was initially authorised, or any other subsystem. In fact, this stage (138) for recording of the extended serial number (SN/ext), as an activity licence, in a working memory (44) of the subsystem (4B) on which the activity (A1) is in the process of initialisation (130), allows the licence management mechanism of the activity to have access to the extended serial number (SN/ext) recorded in the SMBIOS table of the perimeter (P3) on which the activity (A1) is initialising. This extended serial number (SN/ext) contains the serial number (SNA) of the subsystem (4A) on which the activity is authorised and the "ext(A1)" extension attributed to activity A1. Thus, the activity is executed normally on the subsystem (4B) whose serial number (SNB) does not correspond to the serial number (SNA) of the authorised subsystem (4A), as if in fact it were the authorised subsystem.

The stage (138) for recording the extended serial number (SN/ext) as an activity licence in the working memories (44) of the computer hardware resources of the subsystem (4A) in which the perimeter (P1) on which the activity (A1) is in the process of initialisation is configured, can also include a preliminary stage for verifying that the activity requires an activity licence for its execution (150) and a stage for determination of the location, in the interface tables, where the extended serial number must be recorded (SN/ext) as an activity licence. These preliminary stages are effected by means of the processing resources (100) of the administration tool (9) which include resources for verifying the need for licence management mechanisms resources to determine the location at which the extended serial number must be recorded before the execution of the activity, so that the activity can execute the stage (140) for verifying the authenticity of the activity licence, by comparison of the extended serial number (SN/ext) with the internal licence number of the program. These resources allow the processing resources (100) of the administration tool (9), for example, to access the identity objects (ID1, ID2, ID3) stored in the configuration memory (72) and to extract from them, firstly, data representing the need for a licence management mechanism and, secondly, data representing the location, in the interface tables, where the extended serial number are to be recorded. If the activity requires a licence management mechanism, the identity object will contain data representing this need for a licence management mechanism and data representing the location at which the extended serial number (SN/ext) attributed to the activity as an activity licence must be recorded. The recording module (110) then records the extended serial number (SN/ext) at the appropriate location in an interface table for access to the computer hardware resources of the subsystem (4A), stored in the local working memory (44) of this subsystem (4A). This interface table can be a table of the SMBIOS type, as previously indicated and represented in FIG. 2. When the activity (A1) allows the specification of an address for verification of the activity licence, meaning that this activity allows the administration tool (9) to check the memory address at which the licence will be sought in order to be compared to the internal licence of the activity, then the recording module (110) will record the extended serial number in an OEM field specifically devoted to this end. When the activity does not allow the administration tool (9) to modify the memory address at which the licence will be sought, and on the contrary requires a search for the licence in a standard field in accordance with the specifications of the SMBIOS tables, then the recording module (110) will replace the serial number (SNA, SNB) of the subsystem (4A, 4B) on which the activity is in the process of initialisation, with the extended serial number (SN/ext) of the activity (A1), in this standard field of the SMBIOS interface table for access to the computer hardware resources of the subsystem (4A, 4B). These various capabilities are naturally configurable by the operator managing the system (2), by means of the processing resources (100) of the administration tool (9), through the entry, in the identity object of each of the activities, of data representing the need for a licence management mechanism and data representing the location at which the extended serial number must be recorded (SN/ext) as an activity licence. The administration tool (9) proposes variable configuration options which allow the operator to describe different types of activity to be executed on the different perimeters (P1, P2, P3) of the system. As mentioned previously, the operator can, for example, enter no value for the variable concerning the extended serial number (SN/ext) for the activities that do not require any licence management mechanisms. If this variable has no content, the processing resources (100) of the administration tool (9), by means of the resources of verification of the need for licence management mechanism, will determine automatically, by consulting the identity object, that the activity requires no licence management mechanism and therefore requires no recording of an extended serial number as an activity licence in the interface tables. In another example, the identity object can contain a Boolean variable specifically dedicated to the need for a licence management mechanism and capable of taking either the value "true" if the mechanism requires an activity licence to be executed and therefore the recording of this activity licence in the standard interface tables, or the value "false" if it requires no activity licence. In like manner, the identity objects contain a variable corresponding to the location at which the extended serial number of the activity must be recorded, if so required. This variable can, for example, consist of a Boolean value variable, for which the value "true" will correspond, for example, to the need to record the extended serial number (SN/ext) in a standard field, and the value "false" to the option to record it in an OEM field. In another example, this variable can contain an access path describing a location in the standard interface tables. Thus, the processing resources (100) of the administration tool (9), by means of the resources for determination of the location at which the extended serial number must be recorded (SN/ext) as an activity licence before the execution of the activity in a perimeter, will determine automatically, by consultation of the identity object, the location at which the recording module (110) must record the extended serial number (SN/ext) in the interface tables. In another example, the processing resources (100) of the administration tool (9) can include resources to search for the licence information of the programs installed on the system, and will allow the operator to avoid having, himself, to execute the stages for the specification of these variables of the identity objects by automatically accessing the information of the programs allowing the execution of the activities, among the data stored on the system disks (14, 16) and the data disks (10, 12), and recording them in the identity objects.

In some particular cases, the operator may wish to prevent the execution (150) of an activity on a subsystem (4B) other than that initially authorised (4A). In this case, the authentication stage (134) of the subsystem (4A) on which the execution (150) of the activity (A1) is authorised can consist of a comparison, by the authentication module (106), of the serial number (SNA) of the subsystem (4A) identified according to the extended serial number (SN/ext) of the activity, with only the serial number (SNA, SNB) of the subsystem (4A, 4B) on which the activity (A1) is in the process of initialisation. Thus the authentication module (106) will verify that the activity is in the process of initialisation on the subsystem initially authorised and will prevent the execution of the activity if this is not the case.

According to one method of implementation of the invention, the process is implemented by the administration program (PAM) of the multiple processor system (2), executed on the processing resources (100) of the administration tool (9) of the system (2). This administration program (PAM) is used to manage the configuration hardware of the system (2) by establishing perimeters (P1, P2, P3) in subsystems (4A, 4B) making up the system (2), in accordance with the commands of an operator, entered through the input resources (91) and the display resources (92) of the administration tool (9) of the system. This administration program (PAM) is thus used to control, by means of interface cards (46a, 46b), the access to the computer hardware resources of the subsystems (4A, 4B) making up the system, and to control the initialisation (130) of activities on the perimeters (P1, P2, P3) configured on the system (2), by means of the extended serial numbers (SN/ext) of these activities, by controlling the interoperability of the different modules and resources of the system (2).

It must be obvious to those well versed in the profession that this present invention allows methods of implementation in many other specific forms without moving outside the area of application of the invention as claimed. As a consequence, these present methods of implementation must be considered to be given by way of illustration, but can be modified within the area described by the scope of the attached claims, and the invention must not be limited solely to the details given above.

What is claimed is:

1. A flexible management method for managing a plurality of activities executed within at least one computer hardware resource perimeter which is configured at least one multicellular computer platform of a plurality of multicellular computer platforms, each computer platform defining a subsystem of a multiple processor system, each activity including at least one operating system configured to manage the computer hardware resources of the perimeter within which the activity it is intended to be executed, the at least one multicellular computer platform including a plurality of distinct computer hardware resource perimeters configured to be activated successively or simultaneously on said multicellular computer platform, the method comprising:

identifying an activity, upon initialization of the activity within a perimeter, using an extended serial number associated with the activity, the extended serial number being stored in a storage resource module of a management tool, and the extended serial number including the serial number of a subsystem on which the execution of the activity is authorized;

authenticating the serial number of the subsystem on which the execution of the activity is authorized;

verifying the extended serial numbers of activities already being executed on a different subsystem of the system; and recording the extended serial numbers as activity licenses in working memories of the computer hardware resources of the subsystems in which perimeters within which the activities which are in the process of initialization are configured, wherein said activities are executed using a management system comprising a plurality of multicellular computer platforms, each said multicellular computer platform including a plurality of computing cells and an associated working memory, and each said multicellular computer platform defining a subsystem of the multiple computer processing system, a serial number being associated with each said subsystem, and an extended serial number being associated with each activity which is authorized to be executed on a subsystem;

a plurality of hardware resource perimeters configured on one or more computing cells of the multicellular computer platforms, wherein each of the hardware resource perimeters includes one or more computer hardware resources belonging to a different multicellular computer platform;

an administration tool operatively coupled to the plurality of multicellular computer platforms to manage the plurality of activities executed within the computer hardware resource perimeters, each said activity including at least one operating system configured to manage the computer hardware resources of the perimeter within which the activity is intended to be executed, the administration tool including a configuration module to specify the perimeters of the computer hardware resources and to simultaneously or successively activate the perimeters on each of the multicellular computer platforms; and a common computer resource module including a plurality of storage resources for storing the plurality of activities, each activity containing at least one operating system capable of managing the computer resources of the perimeter at which it is intended to be executed, wherein the administration tool further includes a storage resource module configured to store a list of the serial numbers corresponding to the subsystems, and including a configuration memory containing a plurality of extended serial numbers, the extended serial numbers being associated with activities authorized to be executed on the subsystems; and a processing resource module including a subsystem authentication module configured to authenticate the subsystem on which activities are authorized to be executed according to the list of serial numbers of the subsystems;

a verification module for verifying the extended serial numbers of the activities in the process of being executed within the perimeters; and a recording module for recording the extended serial numbers as activity licenses in working memories of the computer hardware resources of the multicellular computer platforms in which the perimeter within which the activity which is in the process of initialization is configured.

2. A method according to claim 1, further comprising:
verifying authenticity of an activity license,
wherein the verifying includes comparing, using the computer hardware resources of the subsystem in which a perimeter within which the activity which is in the process of initialization is configured, the extended serial number recorded as an activity license in the working memories of the computer hardware resources of the subsystem in which the perimeter within which the activity which is in the process of initialization is configured, and an internal license number of a program responsible for the activity,
wherein the comparing allows for the execution of the activity when there is agreement between the activity license and the internal license or for interruption of the initialization of the activity when there is no agreement between the activity license and the internal license.

3. A method according to claim 1, further comprising:
attributing an extended serial number to each of the activities intended to be executed at the perimeters of the system by entering operator inputted commands using input resources and display resources of the administration tool, the attributing including:
copying the serial numbers of each of the subsystems on which the activities are intended to be executed;
selecting a serial number for each of the activities and attributing an extension to each of the activities;
adding the extensions to the selected serial numbers so as to obtain the extended serial numbers attributed to each of the activities; and
recording the extended serial numbers attributed to each of the activities in a configuration memory of a storage resource module included in the administration tool during installation of the activities on the system.

4. A method according to claim 1, further comprising:
informing an administration program which requires a license management mechanism for the execution of the activities, of the extended serial numbers attributed to the activities intended to be executed within the perimeters of the system, wherein the informing allows for use of the extended serial numbers in determining internal licenses for the administration program for verifying authenticity of the licenses of the activities.

5. A method according to claim 1, further comprising:
entering, through input and display resources included in the administration tool, the activities to be executed within different perimeters of the system, in order to allow initialization of at least one activity within a perimeter which includes computer hardware resources belonging to a subsystem other than the subsystem corresponding to the extended serial number attributed to the activity.

6. A method according to claim 1, wherein the authenticating includes:

comparing, using an authentication module included in the processing resource module of the administration tool, the serial number of the subsystem identified by the extended serial number of the activity, with a list of serial numbers of the subsystems, wherein the list of serial numbers is stored in a storage resource module included in the administration tool, and allowing interruption of the initialization of the activity when the serial number of the subsystem on which the activity is authorized to be executed is not present in the list, or allowing initialization and execution of the activity when the serial number is present in the list.

7. A method according to claim 1, wherein the verifying of the extended serial numbers of the activities in the process of execution in the system includes comparing, using a verification module for verifying activities present in a processing resource module of the administration tool, the extended serial number of the activity in the process of initialization with a plurality of extended serial numbers of activities executing in the system, wherein the comparing allows for either interruption of the initialization of the activity by the processing resource module when the extended serial number of the activity in the process of initialization is already being used for execution of an activity within one of the perimeters, or initialization and execution of the activity otherwise.

8. A method according to claim 1, wherein the method is implemented by an administration program of the multiple processor system executed on a processing resource module of the administration tool managing the configuration hardware of the system, wherein the method is implemented by establishing the perimeters in the subsystems in accordance with commands from an operator entered through an input resource and a display resource of the administration tool, and wherein the administration program controls an operation of the computer hardware resources of the subsystems and controls the initialization of the activities within the perimeters using the extended serial numbers of the activities through interface cards.

9. A method according to claim 1, wherein the recording of the extended serial numbers as activity licenses in the working memories of the computer hardware resources includes:

verifying a need for an activity license for the execution of the activity and, if required, determining a location at which the extended serial number must be recorded as an activity license, and recording the extended serial numbers in an interface table stored in a recording module included in the administration tool, for access to the computer hardware resources of the subsystem at the determined location corresponding either to a specific field, when the activity allows specification of an address for verification of the license, or to a standard field, when the activity requires replacement of the serial number of the subsystem in which the perimeter is configured by the extended serial number of the activity.

10. A method according to claim 3, wherein the attribution of the extended serial numbers further includes:

creating identity objects using an identity creation module included in the processing resource module of the administration tool, wherein variables of the identity objects correspond to information relating to the execution of the activity within the perimeters, need for a license management mechanism, the extended serial number attributed to the activity, and a location at which the extended serial number must be recorded before the execution of the activity, and creating domain objects using a configuration module included in the administration tool, wherein variables of the domain objects correspond to information relating to specification of the perimeters and to activities to be executed within each of the perimeters, and wherein the identity objects and the domain objects are recorded in a configuration memory of the storage resource module included in the administration tool.

11. A method according to claim 1, wherein the authenticating of the subsystem on which the execution of the activity is authorized further includes:

comparing, using an authentication module, the serial number of the subsystem identified by the extended serial number of the activity, with only the serial number of the subsystem on which the activity is in the process of initialization, so as to prevent the execution of the activity on a subsystem other than that which was initially authorized.

12. A flexible management system for executing a plurality of activities in a multiple computer processing systems, the flexible management system comprising:

a plurality of multicellular computer platforms, each said multicellular computer platform including a plurality of computing cells and an associated working memory, and each said multicellular computer platform defining a subsystem of the multiple computer processing system, a serial number being associated with each said subsystem, and an extended serial number being associated with each activity which is authorized to be executed on a subsystem;

a plurality of hardware resource perimeters configured on one or more computing cells of the multicellular computer platforms, wherein each of the hardware resource perimeters includes one or more computer hardware resources belonging to a different multicellular computer platform;

an administration tool operatively coupled to the plurality of multicellular computer platforms to manage the plurality of activities executed within the computer hardware resource perimeters, each said activity including at least one operating system configured to manage the computer hardware resources of the perimeter within which the activity is intended to be executed, the administration tool including a configuration module to specify the perimeters of the computer hardware resources and to simultaneously or successively activate the perimeters on each of the multicellular computer platforms; and a common computer resource module including a plurality of storage resources for storing the plurality of activities, each activity containing at least one operating system capable of managing the computer resources of the perimeter at which it is intended to be executed, wherein the administration tool further includes a storage resource module configured to store a list of the serial numbers corresponding to the subsystems, and including a configuration memory containing a plurality of extended serial numbers, the extended serial numbers being associated with activities authorized to be executed on the subsystems; and a processing resource module including a subsystem authentication module configured to authenticate the subsystem on which activities are authorized to be executed according to the list of serial numbers of the subsystems;

a verification module for verifying the extended serial numbers of the activities in the process of being executed within the perimeters; and a recording module for recording the extended serial numbers as activity licenses in working memories of the computer hardware resources of the multi-cellular computer platforms in which the perimeter within which the activity which is in the process of initialization is configured.

13. A system according to claim 12, further comprising:
an input resource and a display resource which enable an operator to attribute an extended serial number to each of the activities intended to be executed within the perimeters by copying the serial number of each of the subsystems on which the activities are intended to be executed, selecting a serial numbers for each of the activities, adding an extension to said serial number to obtain an extended serial number, and recording the extended serial numbers attributed to each of the activities into the configuration memory of the storage resource module.

14. A system according to claim 12, wherein the administration tool further includes a configuration module to specify the activities to be executed within each of the perimeters, the configuration module including:
resources for initializing at least one activity within a perimeter, wherein the perimeter can include computer hardware resources belonging to a subsystem other than the subsystem corresponding to the extended serial number attributed to the activity;
resources for creating domain objects including variables corresponding to information relating to specification of the perimeters and to activities to be executed within each of the perimeters; and
an identity creation module for creating identity objects including variables corresponding to information relating to the execution of the activity within the perimeters, need for a license management mechanism, the extended serial number attributed to the activity, and a location at which the extended serial number must be recorded before the execution of the activity,
wherein the information relating to the execution of the activity within the perimeter includes a name of the activity, and
wherein the identity objects and the domain objects are recorded in the configuration memory of the storage resource module.

15. A system according to claim 12, wherein the computer hardware resources in which the perimeters within which the activities which are in the process of initialization are configured, comprise:
resources for accessing interface tables stored in the working memories of the computer hardware resources, the extended serial numbers recorded as activity licenses being recorded in the interface tables;
resources for comparing the activity licenses with internal license numbers of programs responsible for the activities; and
resources for authorizing the execution of the activities in an event of agreement between the activity licenses and the internal license numbers or for interruption of the initialization of the activities in an event of no agreement.

16. A system according to claim 12, wherein the processing resource module is configured to execute an administration program by establishing the perimeters in accordance with an operator command entered through an input resource and a display resource, the administration program being used to control, using standard interface cards, access to the hardware resources of the system, and to control the initialization of the activities within the perimeters by controlling interoperability of the modules and the resources of the system.

17. A system according to claim 12, wherein the processing resource module further includes:
verification resources for verifying a need for a license management mechanism for each of the activities; and
determination resources to determine a location at which the extended serial number must be recorded before the execution of the activity, the determination resources being configured to allow the recording of the extended serial numbers as activity licenses, using the recording module, at the determined location in reference tables stored in the working memories.

18. A system according to claim 12, wherein the subsystem authentication module further includes resources to compare the serial number of the subsystem on which an activity is authorized to be executed, identified by the extended serial number of the activity, with only the serial number of the subsystem on which the activity is in the process of initialization, so as to prevent the execution of the activity on a subsystem other than the initially authorized subsystem.

* * * * *